United States Patent
Suzuki et al.

(10) Patent No.: US 7,075,689 B2
(45) Date of Patent: Jul. 11, 2006

(54) SCANNING LENS UNIT AND OPTICAL SCANNING APPARATUS INCLUDING THE SAME

(75) Inventors: Yoichi Suzuki, Kanagawa (JP); Yoshinori Morimoto, Kanagawa (JP); Kenichi Saito, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 8 days.

(21) Appl. No.: 11/189,774

(22) Filed: Jul. 27, 2005

(65) Prior Publication Data
US 2006/0023282 A1    Feb. 2, 2006

(30) Foreign Application Priority Data
Jul. 28, 2004    (JP) .............................. 2004-220088

(51) Int. Cl.
*G02B 26/08* (2006.01)
(52) U.S. Cl. .................. 359/204; 359/205; 347/244
(58) Field of Classification Search ........ 359/204–206; 347/225, 233, 241, 244
See application file for complete search history.

(56) References Cited

U.S. PATENT DOCUMENTS 6,696,681 B1 * 2/2004 Kodama .................... 359/206
2002/0030158 A1   3/2002 Kodama

FOREIGN PATENT DOCUMENTS

JP    2002-107647 A    4/2002

* cited by examiner

*Primary Examiner*—Euncha P. Cherry
(74) *Attorney, Agent, or Firm*—Birch, Stewart, Kolasch & Birch, LLP

(57) ABSTRACT

The scanning lens unit includes lenses located between a optical deflector and a lens having a k-th lens surface $S_k$ from a first lens surface $S_1$ closest to the deflector are disposed such that a height of a lens having the lens surface $S_k$ denoted by $\pi_k$ satisfies the predetermined expression. each of lenses located between the first lens surface $S_1$ and the k-th lens surface $S_k$ is a cylindrical lens having power only in the determined deflection direction. Therefore, the lenses can individually have minimum thicknesses, as a result, the cost reduction of the scanning lens unit is realized. The optical scanning apparatus includes the scanning lens and hence can achieve cost reduction.

18 Claims, 4 Drawing Sheets

SCANNING LENS UNIT AND OPTICAL SCANNING APPARATUS INCLUDING THE SAME

BACKGROUND OF THE INVENTION

The present invention relates to a scanning lens unit used in an optical unit that performs light beam scanning for exposure of a photosensitive material or the like in a digital photo printer and to an optical scanning apparatus including the scanning lens unit.

An optical scanning apparatus has been used in various image recording apparatuses such as a digital photo printer and an electrophotographic printer. In the optical scanning apparatus, a light beam modulated in accordance with an image to be recorded is deflected in a predetermined one-dimensional direction (main scanning direction) and an image recording medium such as a photosensitive material is scanned by exposure to the light beam to record a latent image or a visualized image on the image recording medium.

For example, in the case of the optical scanning apparatus for recording a color image (latent image) on a color photosensitive material (photographic paper), three kinds of light beams corresponding to the respective exposures, that is, R (red) exposure, G (green) exposure, and B (blue) exposure, which were modulated in accordance with an image to be recorded (image data) are deflected in a main scanning direction by an optical deflector such as a polygon mirror. The scanning speed in the main scanning direction is maintained constant by an fθ lens (scanning lens). The light beams are allowed to enter an image recording medium at a predetermined recording (exposure) position by a mirror for changing the optical path or the like to thereby record a latent image thereon.

The scanning lens unit used in the optical scanning apparatus needs to have not only power in the main scanning direction but also power in a sub scanning direction to perform beam shaping and aberration correction in the sub-scanning direction. In an optical system that uses the beams having different wavelengths (multiple wavelength beams) as described above, it is required that not resin but glass be used for the lens material to suppress the occurrence of aberration. Not aspherical lens but spherical lens is very often necessary in view of workability so that the scanning lens unit has also power in the sub scanning direction. The spherical lens is expensive because it is necessary to process each lens into a spherical shape or to cut a glass ball into a desired shape after the glass ball has been polished. Particularly the latter method wastes a substantial amount of glass. Therefore, the scanning lens unit has been one of factors that increase the manufacturing cost of the image recording apparatus.

A method of producing a scanning lens unit using a free-form surface lens made of a resin material can be used for the method of reducing the manufacturing cost. However, there is a problem in that the correction of the lateral chromatic aberration relying on dispersion is not possible in a lens made of the resin material, although it is possible in a lens made of a glass material. In particular, in a recording apparatus of the type in which a photosensitive material is scanned by exposure to three kinds of light beams, that is, R, G, and B light beams as described above, the level required for corrections of various aberrations in the main scanning direction such as field curvature, fθ property (distortion), and lateral chromatic aberration, and for performance in the sub scanning direction such as image plane tilt correction is higher than that in a usual laser printer. Therefore, it is necessary that the scanning lens unit be composed of lenses, each of which has a spherical structure and is made of a glass material. Thus, it is hard to reduce the manufacturing cost.

In order to realize a reduction in manufacturing cost of the scanning lens unit made of a glass material, the applicant of the present invention disclosed an fθ lens in JP 2002-107647 A. The fθ lens includes three lenses, that is, a first lens having a negative refractive index, a second lens having a positive refractive index, and a third lens having a positive refractive index, which are disposed in this order from the optical deflector side. The lens surface of at least one of the three lenses is a cylindrical surface having power only in the direction in which light beams are deflected. In JP 2002-107647 A, not spherical lenses but cylindrical lenses are used for the first to third lenses to achieve a reduction in manufacturing cost.

However, lenses are not necessarily optimally structured in the scanning lens unit disclosed in JP 2002-107647 A because of the relationship with the laser light beams and the polygon mirror used. In particular, the scanning lens unit is only composed of the cylindrical lenses, each of which has power in the main scanning direction. Therefore, the case where the spherical lens for correcting aberration in the sub scanning direction is used is not examined at all.

SUMMARY OF THE INVENTION

The present invention has been made in view of the above-mentioned circumstances. Therefore, an object of the present invention is to provide a scanning lens unit which has an optimized thickness and can be manufactured at low cost and to provide an optical scanning apparatus including the scanning lens unit.

Another object of the present invention is to provide a scanning lens unit having a lens surface structure which is extremely advantageous in terms of cost and an optical scanning apparatus including the scanning lens unit.

In order to achieve the above-mentioned objects, according to a first aspect of the present invention, there is provided a scanning lens unit, which is disposed between an optical deflector for deflecting an incident laser light beam to a predetermined deflection direction at a constant angular speed and a surface to be scanned, and which includes plural lenses, wherein, when a reflective surface of the optical deflector is given by $S_0$, and a k-th (k is a positive integer) lens surface counted from a first lens surface $S_1$ closest to the optical deflector is denoted by $S_k$, each of lenses located between the first lens surface $S_1$ and the k-th lens surface $S_k$ is a cylindrical lens having power only in the predetermined deflection direction, and wherein, when the laser light beam includes plural laser light components having different wavelengths and a wavelength of a j-th laser light component counted in ascending order from a first laser light component having a shortest wavelength, of the plural laser light components is denoted by $\lambda_j$ (j=1, 2, . . . ), and when a height of a lens having the k-th lens surface $S_k$ is denoted by $\pi_k$, lenses located between the optical deflector and the lens having the k-th lens surface $S_k$ are disposed such that the following expression (1) is satisfied and centers of the lenses in a lens height direction are aligned with one another.

$$\Pi_k \leq \left[ 2 \times \left| \sum_{i=0}^{i=k-1} d_i \tan\theta_{ij} + 2\omega_j \sqrt{1 + \left( \frac{\lambda_j \sum_{i=0}^{i=k-1} \frac{d_i}{n_{ij} \cdot \cos\theta_{ij}}}{\pi \omega_j^2} \right)^2} + \delta_j + \xi_j \right| \right]_{\text{maximum value when } j \text{ is changed}} \quad (1)$$

In the expression, $d_i$ denotes a surface interval between a lens surface $S_i$ and a lens surface $S_{i+1}$, $d_0$ denotes a surface interval between the reflective surface $S_0$ and the first lens surface $S_1$, $n_{ij}$ denotes a refractive index of a medium between the lens surface $S_i$ and the lens surface $S_{i+1}$ with respect to a laser light component having the wavelength $\lambda_j$, $\omega_j$ denotes a beam waist of the laser light component having the wavelength $\lambda_j$ on the reflective surface $S_0$ of the optical deflector, $\delta_j$ denotes a difference between an incident position of a principal ray of the incident laser light beam incident on the reflective surface of the optical deflector in a rotational shaft direction of the optical deflector and a center position of the reflective surface, $\xi_j$ denotes a width of an allowable area of cracking and chipping in the lens height direction, and $\theta_{ij}$ denotes an incident angle relative to the reflective surface and satisfies the following expression (2), $$\sin\theta_{ij} = \frac{n_{0j}}{n_{ij}} \sin(\Phi_j + 2\varphi), \quad (2)$$

assume that $\Phi_j$ denotes an angle of the laser light component having the wavelength $\lambda_j$ relative to a plane perpendicular to a rotational shaft of the optical deflector, and $\varphi$ denotes a maximum value of a deflective surface tilt amount, which is a surface tilt amount relative to an ideal reflective surface, including tolerance in considerations of surface tilt of the reflective surface of the optical deflector and shaft tilt of the rotational shaft of the optical deflector.

In the present invention, the term "allowable area of cracking and chipping" means an end portion region in which optical performance cannot be ensured due to cracking or chipping caused in the end portion of a lens at the time of lens polishing or cutting.

Further, in order to achieve the above-mentioned objects, according to a second aspect of the present invention, there is provided a scanning lens unit, which is disposed between an optical deflector for deflecting an incident laser light beam to a predetermined deflection direction at a constant angular speed and a surface to be scanned, and which includes plural lenses, wherein, when a reflective surface of the optical deflector is denoted by $S_0$, and a k-th (k is a positive integer) lens surface counted from a first lens surface $S_1$ closest to the optical deflector is denoted by $S_k$, each of lenses located between the first lens surface $S_1$ and the k-th lens surface $S_k$ is a cylindrical lens having power only in the predetermined deflection direction, and wherein, when a wavelength of the laser light beam is denoted by $\lambda$, and a height of a lens having the k-th lens surface $S_k$ is denoted by $\pi_k$, lenses located between the optical deflector and the lens having the lens surface $S_k$ are disposed such that the following expression (3) is satisfied and centers of the lenses in a lens height direction are aligned with one another.

$$\Pi_k \leq 2 \times \left[ \sum_{i=0}^{i=k-1} d_i \tan\theta_i + 2\omega \sqrt{1 + \left( \frac{\lambda \sum_{i=0}^{i=k-1} \frac{d_i}{n_i \cdot \cos\theta_i}}{\pi \omega^2} \right)^2} + \delta + \xi_k \right] \quad (3)$$

In the expression, $d_i$ denotes a surface interval between a lens surface $S_i$ and a lens surface $S_{i+1}$, $d_0$ denotes a surface interval between the reflective surface $S_0$ and the first lens surface $S_1$, $n_i$ denotes a refractive index of a medium between the lens surface $S_i$ and the lens surface $S_{i+1}$ with respect to the laser light beam having the wavelength $\lambda$, $\omega$ denotes a beam waist of the laser light beam on the reflective surface $S_0$ of the optical deflector, $\delta$ denotes a difference between an incident position of a principal ray of the incident laser light beam incident on the reflective surface of the optical deflector in a rotational shaft direction of the optical deflector and a center position of the reflective surface, $\xi$ denotes a width of an allowable area of cracking and chipping in the lens height direction, and $\theta_i$ denotes an incident angle relative to the reflective surface and satisfies the following expression (4), assume that $\Phi$ denotes an angle of the laser light beam relative to a plane perpendicular to a rotational shaft of the optical deflector, and $\varphi$ denotes a maximum value of a deflective surface tilt amount, which is a surface tilt amount relative to an ideal reflective surface, including tolerance in considerations of surface tilt of the reflective surface of the optical deflector and shaft tilt of the rotational shaft of the optical deflector.

$$\sin\theta_i = \frac{n_0}{n_i} \sin(\Phi + 2\varphi) \quad (4)$$

According to the first and second aspects of the present invention, it is preferable that the height of each of the lenses is increased in order from a lens closest to the optical deflector. It is another preferable that a lens surface located farthest from the optical deflector has power in the lens height direction. It is further preferable that the lens surface $S_k$ is a lens surface of a lens located farthest from the optical deflector. It is still further preferable that, when a q-th lens surface $S_q$ counted from the first lens surface $S_1$ closest to the optical deflector among lens surfaces is a first surface having power in the lens height direction, which is counted from the optical deflector, a relation of $k \leq q$ is satisfied.

According to a third aspect of the present invention, there is provided an optical scanning apparatus comprising: a scanning lens unit according to any one of the first and second aspects of the present invention; a laser light source, and an optical deflector for deflecting a laser light beam emitted from the laser light source to the scanning lens unit.

According to the third aspect of the present invention, it is preferable that the optical scanning apparatus further comprises at least one other laser light source, and is used to expose a photosensitive material having a plurality of photosensitive layers. It is another preferable that a plurality of laser light sources comprises the laser light source and the at least one other laser light source, each of which emits a laser light beam having a wavelength corresponding to photosensitivity of each of the plurality of photosensitive layers of the photosensitive material. It is further preferable that the photosensitive material is a photographic paper used for a photographic print. It is still further preferable that the plural lenses composing the scanning lens unit are mounted on respective mounting bases located at different heights.

According to the present invention, cylindrical lenses each having power only in the deflection direction can be used for all or most of lenses composing the scanning lens unit and the lenses can individually have minimum thicknesses, which leads to the cost reduction of the scanning lens unit.

The optical scanning apparatus according to the present invention includes the scanning lens unit according to the present invention and hence can achieve cost reduction.

BRIEF DESCRIPTION OF THE DRAWINGS

In the accompanying drawings:

of a laser light beam deflected by the optical deflector 40 such that the centers of the lenses in a lens height direction are aligned with one another. In FIG. 1, mounting bases for mounting the lenses have different heights so that the center positions of the lenses in the lens height direction are aligned with one another. In FIG. 1, the reflective surface of the optical deflector 40 is denoted by $S_0$ and the lens surfaces of the respective lenses are denoted by $S_1, S_2, \ldots, S_m$ in order from the side close to the optical deflector 40. The lens surface $S_m$ is a final surface of the scanning lens unit 42. The laser light beam emitted from a laser light source (not shown in FIG. 1A) is reflected on the reflective surface $S_0$ of the optical deflector 40 and deflected to a direction in which the scanning lens unit 42 is disposed. The laser light beam reflected on the reflective surface $S_0$ of the optical deflector 40 passes through the lens surfaces $S_1, S_2, \ldots, S_m$ sequentially and is condensed onto a surface to be scanned.

Figure 1A:
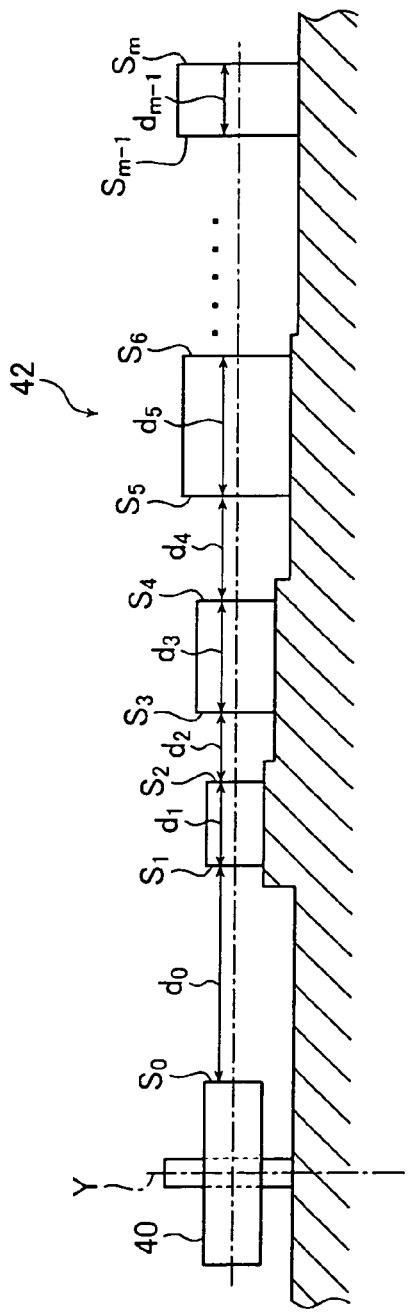
FIGS. 1A and 1B are schematic cross-sectional views for illustrating a structure of a scanning lens unit according to an embodiment of the present invention.

In an optical system including the scanning lens unit 42, the laser light beam passing through the scanning lens unit is shifted in the lens height direction by: a variation in incident position of the principal ray of a laser light beam which is emitted from the laser light source and incident on the reflective surface $S_0$ of the optical deflector 40; a variation in incident angle on the reflective surface $S_0$; image plane tilt of the reflective surface $S_0$ of the optical deflector 40; or the like. Therefore, each of the lenses composing the scanning lens unit needs to have at least a height allowing the shift. The lens height as used in the present invention refers to a height of the lens in a direction perpendicular to a plane formed by the laser light beam deflected on the optical deflector.

In the present invention, the height $\pi_k$ of each of the lenses composing the scanning lens unit 42 is determined so as to satisfy the following inequality (1). Here, $\pi_k$ denotes the height of a lens including a k-th (k is a positive integer) lens surface $S_k$ counted from the lens surface closest to the optical deflector 40. Therefore, the respective lenses composing the optical scanning system can have individually minimum thicknesses and propagation of the laser light beam through the respective lenses composing the scanning lens unit is ensured, which enables irradiation of the recording surface with the laser light beam.

$$\Pi_k \leq 2 \times \left[ \sum_{i=0}^{i=k-1} d_i \tan\theta_{ij} + 2\omega_i \sqrt{1 + \left( \frac{\lambda_j \sum_{i=0}^{i=k-1} \frac{d_i}{n_{ij} \cdot \cos\theta_{ij}}}{\pi \omega_j^2} \right)^2} + \delta_j + \xi_k \right]_{\text{maximum value when } j \text{ is changed}} \quad (1)$$

DETAILED DESCRIPTION OF THE PREFERRED EMBODIMENT

The scanning lens unit and the optical scanning apparatus including the scanning lens unit according to the present invention will be described below in detail with reference to preferred embodiments shown in the accompanying drawings.

First, the scanning lens unit according to an embodiment of the present invention will be described with reference to the drawings.

FIG. 1A is a schematic cross-sectional view showing a scanning lens unit 42 and an optical deflector 40 according to the present invention. The scanning lens unit 42 includes lenses. The respective lenses are disposed on an optical path In the inequality, $\lambda_j$ is the wavelength of a laser light beam used in the optical system. When laser light beam having different wavelengths are used, $\lambda_j$ is the wavelength of the j-th laser light beam counted from the laser light beam having the shortest wavelength.

As shown in FIG. 1A, $d_i$ is the surface interval between a lens surface $S_i$ and a lens surface $S_{i+1}$, that is, the distance between the lens surface $S_i$ and the lens surface $S_{i+1}$ on the principal axis of the scanning lens unit. Here, $d_0$ is the surface interval between the reflective surface $S_0$ and the lens surface $S_1$. In the case of the optical deflector such as a polygon mirror, the optical deflector 40 rotates about a rotational axis Y, so the distance between the reflective surface $S_0$ of the optical deflector 40 and the lens surface $S_1$ changes. Therefore, in the present invention, $d_0$ is the distance between the reflective surface $S_0$ and the lens surface $S_1$ when the laser light beam reflected on the reflective surface $S_0$ is incident on the principal axis of the scanning lens unit.

Figure 1B:
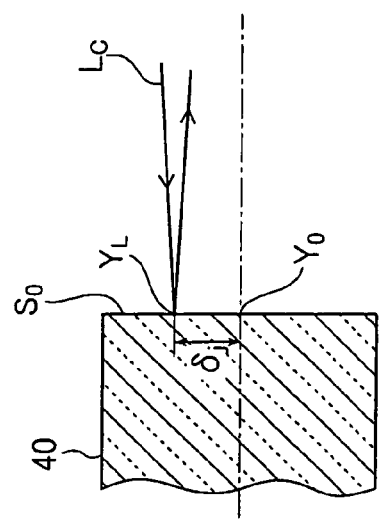

In addition, $n_{ij}$ is the refractive index of a medium between the lens surfaces $S_i$ and $S_{i+1}$ with respect to light having the wavelength $\lambda_j$. Here, $n_{0j}$ is the refractive index of a medium between the reflective surface $S_0$ and the lens surface $S_1$ with respect to the light having the wavelength $\lambda_j$. Reference symbol $\omega_j$ is the beam waist of a laser light beam on the reflective surface $S_0$ when the laser light beam having the wavelength $\lambda_j$ is incident on the optical deflector 40. As shown in FIG. 1B, $\delta_j$ is the distance between the incident position $Y_L$ of the principal ray of the laser light beam incident on the reflective surface $S_0$ of the optical deflector 40 in the rotational axis direction of the optical deflector and the center position $Y_0$ of the reflective surface $S_0$. Reference symbol $\xi_j$ is the width of an allowable area of cracking and chipping caused in an end portion of a lens in the lens height direction. The Reference symbol $\xi_j$ is determined in consideration of the workability and the like and is generally about 0.5 mm to 2.0 mm.

Reference symbol $\theta_{ij}$ is the refractive angle when the laser light beam having the wavelength $\lambda_j$ is refracted at the lens surface $S_i$. Assuming here that $\Phi_j$ is the angle of the laser light beam having the wavelength $\lambda_j$ relative to the deflector rotational plane, that is, a plane perpendicular to the rotational axis of the optical deflector 40, and $\phi$ is the maximum value of the deflective surface tilt amount in consideration of the image plane tilt of the optical deflector 40 and the axis tilt of the optical deflector 40, and also including the tolerance, in other words, the maximum value of the image plane tilt amount relative to the ideal reflective surface $S_0$, $\Phi_j$, $\phi$, and $\theta_{ij}$ satisfy the following relational expression (2).

$$\sin\theta_{ij} = \frac{n_{0j}}{n_{ij}}\sin(\Phi_j + 2\varphi) \quad (2)$$

When each of the lenses composing the scanning lens unit is formed so as to have the lens height satisfying the above-mentioned expression, the thickness of the lens can be minimized while the minimum lens height necessary to propagate a laser light beam is ensured. Therefore, the lens manufacturing cost can be reduced without wasting the glass material used. As shown in FIG. 1, the heights of the mounting bases for mounting the lenses are made different from one another, so the center positions of the lenses in the lens height direction are aligned with one another. Therefore, it is possible to further reduce the lens thickness as compared with the case where the lenses are disposed on the same flat surface.

In the present invention, the lens height of at least one of the lenses composing the scanning lens unit need only be determined so as to satisfy the above-mentioned inequality. However, it is preferable that the lens heights of all the lenses composing the scanning lens unit be determined so as to satisfy the above-mentioned inequality (1). When the lens heights of the lenses composing the scanning lens unit are designed based on the above-mentioned inequality, a lens closer to the optical deflector can have a smaller thickness. Therefore, the manufacturing cost can be reduced than the conventional case.

In the present invention, when only one kind of laser light source having a wavelength $\lambda$ is used, the height of each of the lenses composing the scanning lens unit may be determined so as to satisfy the following expression (3).

$$\Pi_k \le 2 \times \left[ \sum_{i=0}^{i=k-1} d_i \tan\theta_i + 2\omega\sqrt{1+\left(\frac{\lambda\sum_{i=0}^{i=k-1}\frac{d_i}{n_i \cdot \cos\theta_i}}{\pi\omega^2}\right)^2} + \delta + \xi_k \right] \quad (3)$$

In the expression (3), $d_i$ is the surface interval between a lens surface $S_i$ and a lens surface $S_{i+1}$, $d_0$ is the surface interval between the reflective surface $S_0$ and the lens surface $S_1$, $n_i$ is the refractive index of a medium between the lens surfaces $S_i$ and $S_{i+1}$ with respect to a laser light beam having the wavelength $\lambda$, $\omega$ is the beam waist of the laser light beam on the reflective surface $S_0$ of the optical deflector, $\delta$ is the difference between the incident position of the principal ray of the laser light beam incident on the reflective surface of the optical deflector in the rotational axis direction of the optical deflector and the center position of the reflective surface, $\xi$ is the width of an allowable area of cracking and chipping in the lens height direction, and $\theta_i$ is the incident angle relative to the reflective surface. Assuming here that $\Phi$ is the angle of the laser light beam relative to the plane perpendicular to the rotational axis of the optical deflector, and $\phi$ is the maximum value of the deflective surface tilt amount in consideration of tilt of the reflective surface of the optical deflector and axis tilt thereof and also including the tolerance, in other words, the maximum value of the image plane tilt amount relative to the ideal reflective surface, $\Phi$, $\phi$, and $\theta_i$ satisfy the following expression (4).

$$\sin\theta_i = \frac{n_0}{n_i}\sin(\Phi + 2\varphi) \quad (4)$$

In the present invention, some of lenses composing the scanning lens unit, for example, two lenses whose lens surfaces are in intimate contact with each other may be functioned as a single optical lens. In this case, the contact interface between the two lenses is assumed as one lens surface and the lens height is determined based on the calculations of the inequality (1) and the expression (3).

In the present invention, it is preferable that each of the lenses composing the scanning lens unit be a cylindrical lens which has power only in the main scanning direction and is made of a glass material. This reason is as follows. A long raw cylindrical lens extending in a direction orthogonal to the principal axis thereof and to the main scanning direction is produced and cut into pieces having desired widths, so a large number of cylindrical lenses each having power only in the main scanning direction can be manufactured. In addition, there are almost no waste parts, so the material cost per lens can be reduced. Further, it is not necessary to process the surface of the cut lens into a curved shape, so the cylindrical lens can be manufactured at low cost.

In the present invention, at least one of the lenses composing the scanning lens unit may be a spherical lens. In this case, the lens height of a lens located between the optical deflector and the spherical lens may be determined so as to satisfy the inequality (1). When more lenses each having a lower lens height are used to reduce the cost of the scanning lens unit, it is preferable to dispose the spherical lens in a position farthest from the optical deflector. It is more preferable to dispose the spherical lens such that the final lens surface becomes a spherical lens surface. If such a spherical lens is used, the height of the lens located between the optical deflector and the spherical lens can be reduced while beam shaping and aberration correction are performed in the sub scanning direction.

In FIG. 1A, the lenses composing the scanning lens unit are mounted on the mounting bases formed at different heights. When the center positions of the respective lenses in the lens height direction are aligned with one another, an arbitrary structure can be used. The center positions of the respective lenses in the lens height direction may be adjusted using a position adjustment mechanism for separately adjusting the positions of the respective lenses in the lens height direction. For example, a shim adjustment mechanism can be used as the position adjustment mechanism.

Figure 2:
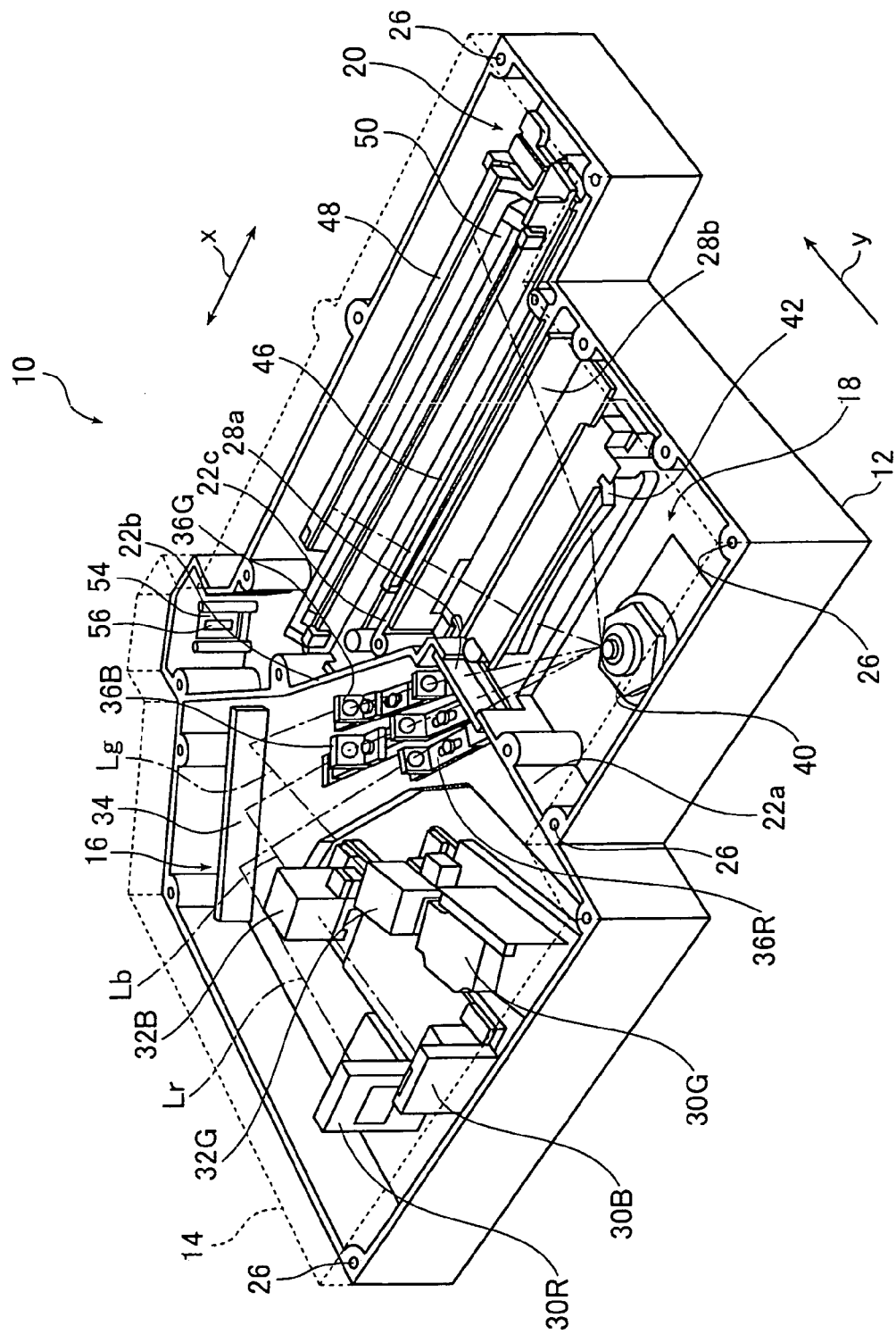
FIG. 2 is a schematic perspective view showing an embodiment of an optical scanning apparatus having the scanning lens unit according to the present invention, in which a cover is removed.

Next, an optical scanning apparatus including the scanning lens unit according to the present invention will be described in detail with reference to FIG. 2. FIG. 2 is a schematic structural view showing an embodiment of an optical scanning apparatus 10.

The optical scanning apparatus 10 is an apparatus for recording an image on a photosensitive material. Three light beams (laser beams) L for R (red) exposure, G (green) exposure, and B (blue) exposure which were modulated in accordance with an image to be recorded (image data) are deflected in a one-dimensional direction (main scanning direction (direction indicated by an arrow x in FIG. 2)). These light beams are then allowed to enter the photosensitive material at a predetermined recording position (exposure position), so the photosensitive material can be scanned by exposure to the light beams.

The optical scanning apparatus 10 is used, for example, in a digital photo printer (printing apparatus) that produces a photographic print based on image data obtained by photo-electrically reading an image shot on a photographic film or image data of an image taken by a digital camera. In this printer, a photosensitive material (photographic printing paper) S is conveyed at the recording position in a direction orthogonal to the main scanning direction (sub scanning direction (direction indicated by an arrow y in FIG. 2)), to two-dimensionally scan the surface of the photosensitive material S by exposure to the light beams deflected in the main scanning direction thereby recording a latent image thereon. The photosensitive material S on which the latent image is recorded is supplied to a processor.

In the embodiment shown in FIG. 2, the optical scanning apparatus 10 includes a frame 12 serving as a casing in which one side surface is opened, a cover 14 for covering the opened side surface (upper surface) of the frame 12, and various optical elements fixed to the frame 12.

In the embodiment shown in FIG. 2, the frame 12 is a casing for accommodating and fixing the various optical elements composing light beam scanning optics and serves as an optical surface plate of the light beam scanning optics. The frame 12 is made of, for example, an aluminum alloy. The frame 12 is roughly divided into a light source section 16, a light deflecting section 18, and a light emitting section 20 by partition walls 22 (22a, 22b, and 22c). Part of the partition wall 22a is removed and a transparent window member 28a is fixed to a region corresponding to the removed part. In addition, part of the partition wall 22c other than the upper part thereof is removed and a transparent window member 28b is fixed to a region corresponding to the removed part.

In total 17 screw holes 26 into which screws are screwed for firmly connecting the frame 12 with the cover 14 are formed in an external wall of the frame 12 and the partition walls 22.

In the embodiment shown in FIG. 2, the light source section 16 in the frame 12 includes laser light sources 30R, 30B, and 30G, acoustic-optical modulators (AOMs) 32G and 32B, a mirror 34, and light quantity/beam focus adjusting means 36B and 36G. The laser light source 30R is a semiconductor laser for emitting a light beam Lr for R exposure. The laser light source 30B is a semiconductor laser for emitting a light beam Lb for B exposure. The laser light source 30G is a light source for emitting a light beam Lg for G exposure. The light beam Lg is generated as a secondary harmonic component obtained by a combination of a laser light source and a second harmonic generation (SHG) device.

The AOM 32B is disposed on an optical path of the light beam Lb emitted from the laser light source 30B and used to modulate the light beam Lb emitted from the laser light source 30B based on an image data signal. The AOM 32G is disposed on an optical path of the light beam Lg emitted from the laser light source 30G and used to modulate the light beam Lg based on an image data signal. The light beam Lr is modulated based on image data by direct modulation for modulation-driving the laser light source 30R.

The mirror 34 is provided to reflect the light beams Lr, Lg, and Lb respectively emitted from the laser light sources 30R, 30G, and 30B toward the same line or its vicinity on the reflective surface of the optical deflector. The light quantity/beam focus adjusting means 36R is disposed on the optical path of the light beam Lr reflected on the mirror 34 and adjusts the quantity of the light beam Lr and the beam focus (beam diameter) thereof. The light quantity/beam focus adjusting means 36G is disposed on the optical path of the light beam Lg reflected on the mirror 34 and adjusts the quantity of the light beam Lg and the beam focus (beam diameter) thereof. The light quantity/beam focus adjusting means 36B is disposed on the optical path of the light beam Lb reflected on the mirror 34 and adjusts the quantity of the light beam Lb and the beam focus (beam diameter) thereof. The light beams Lr, Lg, and Lb whose light quantities and beam focuses are adjusted by the light quantity/beam focus adjusting means 36R, 36G, and 36B pass through a window member 28a and is incident on the optical deflector 40.

The light deflecting section 18 of the frame 12 includes the optical deflector 40 and an fθ lens (scanning lens) 42. The light emitting section 20 of the frame 12 includes a cylindrical lens 46, a cylindrical mirror 48, and a flat mirror (mirror for directing the light beams downward) 50. Optical elements which are disposed in the light deflecting section 18 and the light emitting section 20 will be described in detail later.

The light beams L (Lr, Lb, and Lg) deflected in the main scanning direction by the optical deflector 40 are adjusted by the scanning lens unit 42 so as to have a uniform scanning speed.

The light beams L having passed through the scanning lens unit 42 pass through the window member 28b and the cylindrical lens 46. Then, the light beams L are reflected on the cylindrical mirror 48 to adjust the optical paths and the image plane tilts are corrected. After that, the light beams L are reflected downward by the flat mirror 50 and incident on the photosensitive material S.

Therefore, in the optical scanning apparatus 10 as shown in FIG. 2, the three light beams L (Lr, Lb, and Lg) emitted from the respective light sources are incident on the optical deflector 40 at the same point and deflected thereon. Then, the light beams are incident on the photosensitive material S at predetermined recording positions to form the same scanning line. Therefore, the respective light beams L travel on optical paths which are different from one another in the main scanning direction and substantially aligned with one another in the sub scanning direction. Then, the light beams L are incident on the photosensitive material S at the recording positions (non-beam-synthesizing light beam scanning optics, more specifically, three-laser beam different-angle incidence optics or three-light source non-beam-synthesizing optics).

Figure 3:
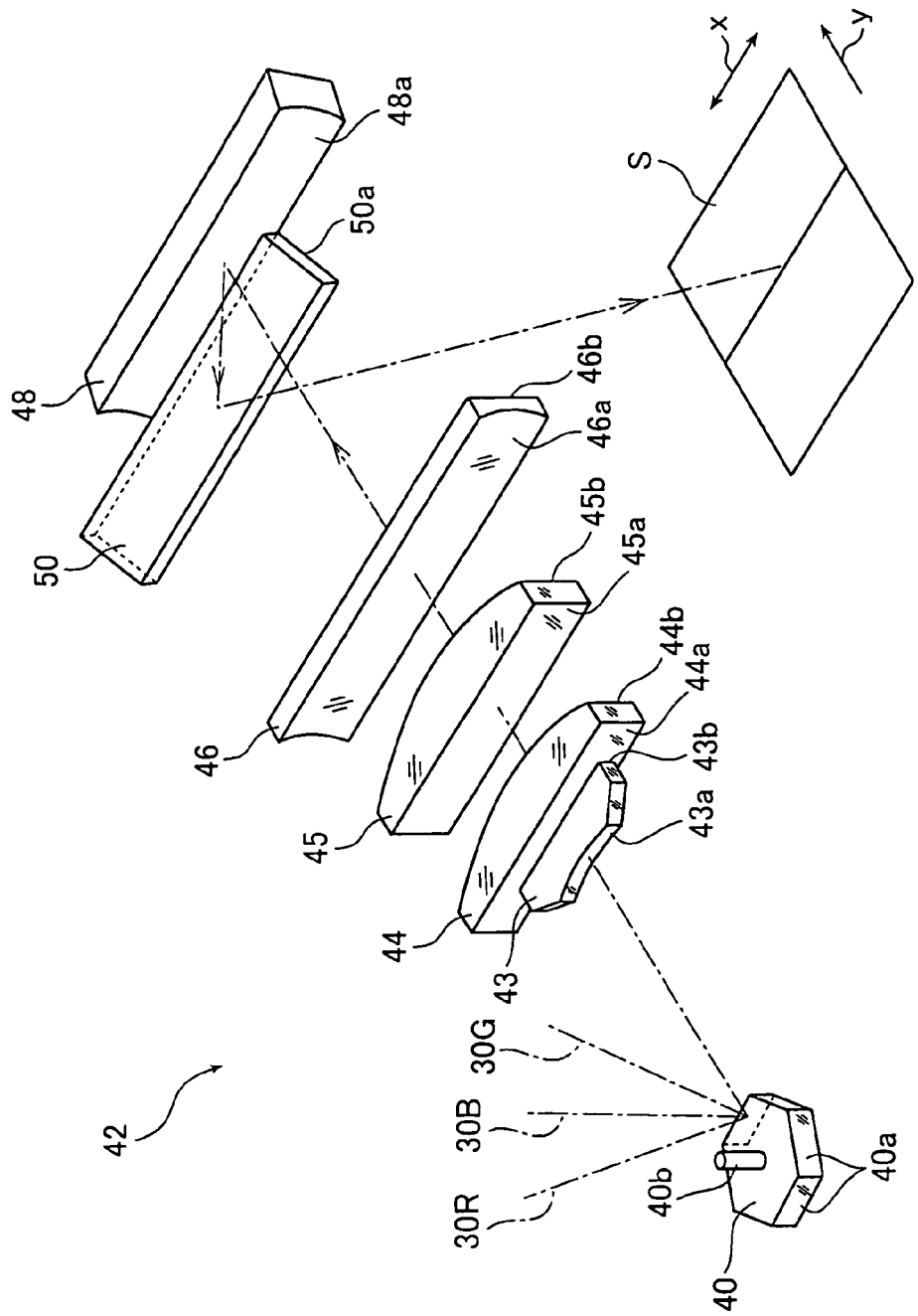
FIG. 3 is a schematic perspective view showing optical elements disposed in a light deflecting section and a light emitting section of the optical scanning apparatus shown in FIG. 2.

Here, the optical parts disposed in the light deflecting section 18 and the light emitting section 20 of the frame 12 of the optical scanning apparatus shown in FIG. 2 will be specifically described. FIG. 3 shows a schematic configuration of the optical parts disposed in the light deflecting section 18 and the light emitting section 20.

The optical deflector 40 disposed in the light deflecting section 18 is a polygon mirror having six reflective surfaces (deflective surfaces) 40a and rotated about a rotational axis 40b by a motor (not shown). The reflective surface 40a of the polygon mirror 40 is irradiated with the laser light beams Lr, Lg, and Lb respectively emitted from the laser light sources 30R, 30G, and 30B shown in FIG. 2 at substantially the same position in the rotational axis direction. The laser light beams incident on the polygon mirror 40 are reflected on the reflective surface 40a and deflected to the side on which the scanning lens unit 42 is disposed.

The scanning lens unit 42 is composed of three lenses, that is, a first lens 43, a second lens 44, and a third lens 45. The first lens 43 is a plano-concave lens in which one surface is a concave surface 43a and the other surface is a flat surface 43b. The first lens 43 is disposed such that the concave surface 43a serving as a lens surface faces to the optical deflector 40 side (light incident side). The second lens 44 is a plano-convex lens in which one surface is a flat surface 44a and the other surface is a convex surface 44b. The second lens 44 is disposed such that the flat surface 44a serving as the lens surface faces to the optical deflector 40 side (light incident side). The third lens 45 is also a plano-convex lens in which one surface is a flat surface 45a and the other surface is a convex surface 45b. The third lens 45 is disposed such that the flat surface 45a serving as the lens surface faces to the optical deflector 40 side (light incident side). As shown in FIG. 3, the first lens 43 and the second lens 44 are disposed such that the flat surfaces 43b and 44a are in intimate contact with each other. Each of the concave surface 43a of the first lens 43 and the convex surface 44b of the second lens 44 is a cylindrical surface having power only in the deflection direction. The convex surface 45b of the third lens 45 is the cylindrical surface or a spherical surface.

The heights of the first lens 43, the second lens 44, and the third lens 45 are set based on the above-mentioned expression. That is, the lens height is increased in order of the first lens 43, the second lens 44, and the third lens 45. The first lens 43, the second lens 44, and the third lens 45 are disposed such that the centers thereof in the lens height direction are aligned with one another.

As shown in FIG. 3, the cylindrical lens 46, the cylindrical mirror 48, and the flat mirror 50 are disposed on the light exit side of the scanning lens unit 42. One surface of the cylindrical lens 46 is a concave cylindrical surface 46a having power only in a direction perpendicular to the deflection direction and the other surface thereof is a flat surface 46b. The cylindrical lens 46 is disposed such that the cylindrical surface 46a faces to the scanning lens unit 42 side. The flat mirror 50 is disposed between the cylindrical lens 46 and the cylindrical mirror 48 and above them. The cylindrical mirror 48 is disposed such that light incident on the reflective surface 48a is incident on a reflective surface 50a of the flat mirror 50 disposed above. The laser light beams having passed through the cylindrical lens 46 are incident on the cylindrical mirror 48 and reflected thereon. Then, the reflected laser light beams are incident on the flat mirror 50. The laser light beams incident on the flat mirror 50 are reflected to the recording medium. The image plane tilt in the polygon mirror 40 is corrected by the cylindrical lens 46 and the cylindrical mirror 48.

Next, an optical sensor for detecting a synchronous signal for starting image recording on the photosensitive material S (SOS (start of scan)) will be described with reference to FIGS. 2 and 4. In the optical scanning apparatus 10, an optical sensor 54 is disposed in the light emitting section 20 of the frame 12. The optical sensor 54 is a line sensor extending in the vertical direction (that is, substantially sub scanning direction).

Figure 4:
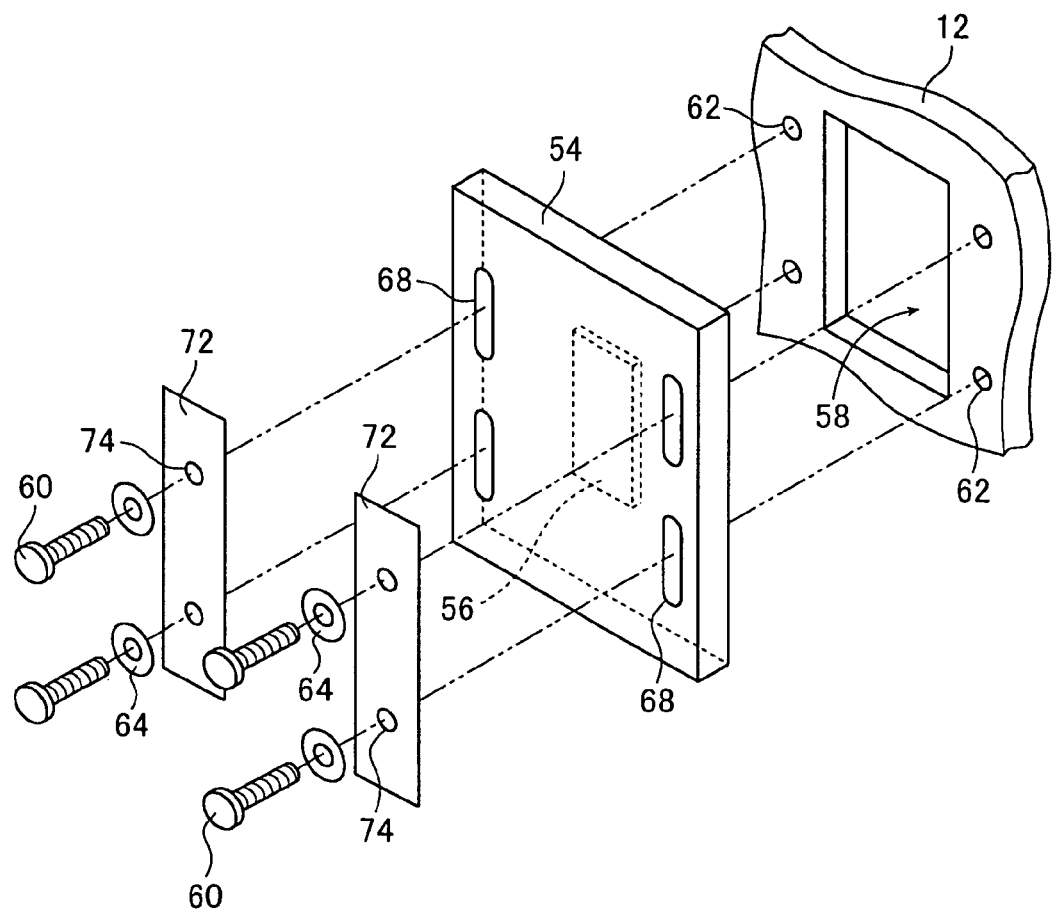
FIG. 4 is a schematic exploded perspective view illustrating how an SOS sensor is mounted on the optical scanning apparatus shown in FIG. 2.

As shown in FIG. 4, an opening 58 that is bored through an outer wall of the frame 12 and is used to insert a light receiving portion 56 of the optical sensor 54, and four bolt holes 62 through which bolts 60 for fixing the optical sensor 54 are inserted are formed in the frame 12 of the scanning optical apparatus 10.

Four bolt holes 68 through which the bolts 60 are inserted are formed in the optical sensor 54. Two long plate members 72 extending in the vertical direction are located on the rear surface (surface opposed to the surface on which the light receiving portion 56 is located) of the optical sensor 54. Two through holes 74 each having a diameter corresponding to a diameter of each of the bolts 60 are provided in each of the plate members 72. The two through holes 74 correspond to the bolt holes 68 arranged in the vertical direction. Note that one of the two through holes 74 provided in each of the plate members 72 may be a slightly long hole for accommodating tolerance.

The light receiving portion 56 of the optical sensor 54 is inserted into the inner portion of the frame 12 from the opening 58. The plate members are located on the rear surface of the optical sensor 54. The bolts 60 are inserted through the through holes 74 of the plate members 72, the bolt holes 68 of the optical sensor 54 and the bolt holes 62, and tightened with washers 64 and nuts (not shown) to fix the optical sensor 54 to the frame 12.

Each of the bolt holes 68 of the optical sensor 54 is a long hole extending in the vertical direction. Therefore, even when the cover 14 is not removed from the scanning optical apparatus 10, that is, the frame 12 is closed, the position of the optical sensor 54 in the vertical direction (sub scanning direction) can be adjusted from the outside.

In the embodiment shown in FIG. 4, the bolt holes 68, each of which is a long hole are closed by the two plate members 72 to fix the optical sensor 54 to the frame 12. Therefore, even when the bolts 60 are loosened to adjust the position of the optical sensor 54, it is possible to prevent dust from entering the inner portion of the frame 12 through the bolt holes 68 and 62.

As shown in FIG. 2, the upper surface (open surface) of the frame 12 in which the optical elements are fixed is covered with the cover 14. The scanning optical apparatus 10 is (substantially) sealed by covering the upper surface of the frame 12 with the cover 14. Therefore, dust resistance in the scanning optical apparatus, that is, dust resistance of each of the optical elements disposed in the frame 12 is ensured.

A method of firmly connecting the frame 12 with the cover 14 is not particularly limited. Therefore, it is possible to employ various known methods such as a method using screws, a method using bolts and nuts, and a method in which a fixing member is combined with engagement between recesses and projections.

The scanning lens unit and the optical scanning apparatus including the scanning lens unit according to the present invention have been described in detail, but the present invention is not limited to the above-described embodiments. Thus, various improvements and modifications may be made without departing from the scope of the present invention.

The scanning lens unit of the present invention is not limited to an apparatus for exposing the photosensitive material and can be also applied to an apparatus for scanning a surface with a light beam at a substantially constant speed, such as a display apparatus.

What is claimed is:

1. A scanning lens unit, which is disposed between an optical deflector for deflecting an incident laser light beam to a predetermined deflection direction at a constant angular speed and a surface to be scanned, and which includes plural lenses, wherein, when a reflective surface of said optical deflector is given by $S_0$, and a k-th (k is a positive integer) lens surface counted from a first lens surface $S_1$ closest to said optical deflector is denoted by $S_k$, each of lenses located between said first lens surface $S_1$ and said k-th lens surface $S_k$ is a cylindrical lens having power only in said predetermined deflection direction, and wherein, when said laser light beam includes plural laser light components having different wavelengths and a wavelength of a j-th laser light component counted in ascending order from a first laser light component having a shortest wavelength, of said plural laser light components is denoted by $\lambda_j$ (j=1, 2, ...), and when a height of a lens having said k-th lens surface $S_k$ is denoted by $\pi_k$, lenses located between said optical deflector and said lens having said k-th lens surface $S_k$ are disposed such that the following expression (1), $$\Pi_k \leq 2 \times \left[ \sum_{i=0}^{i=k-1} d_i \tan\theta_{ij} + 2\omega_j \sqrt{1 + \left( \frac{\lambda_j \sum_{i=0}^{i=k-1} \frac{d_i}{n_{ij} \cdot \cos\theta_{ij}}}{\pi\omega_j^2} \right)^2} + \delta_j + \xi_k \right]_{\text{maximum value when } j \text{ is changed}}, \quad (1)$$

is satisfied and centers of said lenses in a lens height direction are aligned with one another, where $d_i$ denotes a surface interval between a lens surface $S_i$ and a lens surface $S_{i+1}$, $d_0$ denotes a surface interval between said reflective surface $S_0$ and said first lens surface $S_1$, $n_{ij}$ denotes a refractive index of a medium between said lens surface $S_i$ and said lens surface $S_{i+1}$ with respect to a laser light component having said wavelength $\lambda_j$, $\omega_j$ denotes a beam waist of said laser light component having said wavelength $\lambda_j$ on said reflective surface $S_0$ of said optical deflector, $\delta_j$ denotes a difference between an incident position of a principal ray of said incident laser light beam incident on said reflective surface of said optical deflector in a rotational shaft direction of said optical deflector and a center position of said reflective surface, $\epsilon_j$ denotes a width of an allowable area of cracking and chipping in said lens height direction, and $\theta_{ij}$ denotes an incident angle relative to said reflective surface and satisfies the following expression (2), $$\sin\theta_{ij} = \frac{n_{0j}}{n_{ij}} \sin(\Phi_j + 2\varphi), \quad (2)$$

assume that $\theta_j$ denotes an angle of said laser light component having said wavelength $\lambda_j$ relative to a plane perpendicular to a rotational shaft of said optical deflector, and $\phi$ denotes a maximum value of a deflective surface tilt amount, which is a surface tilt amount relative to an ideal reflective surface, including tolerance in considerations of surface tilt of said reflective surface of said optical deflector and shaft tilt of said rotational shaft of said optical deflector.

2. The scanning lens unit according to claim 1, wherein said height of each of said lenses is increased in order from a lens closest to said optical deflector.

3. The scanning lens unit according to claim 1, wherein a lens surface located farthest from said optical deflector has power in said lens height direction.

4. The scanning lens unit according to claim 1, wherein said lens surface $S_k$ is a lens surface of a lens located farthest from said optical deflector.

5. The scanning lens unit according to claim 1, wherein, when a q-th lens surface $S_q$ counted from said first lens surface $S_1$ closest to said optical deflector among lens surfaces is a first surface having power in said lens height direction, that is counted from said optical deflector, a relation of k≦q is satisfied.

6. A scanning lens unit, which is disposed between an optical deflector for deflecting an incident laser light beam to a predetermined deflection direction at a constant angular speed and a surface to be scanned, and which includes plural lenses, wherein, when a reflective surface of said optical deflector is denoted by $S_0$, and a k-th (k is a positive integer) lens surface counted from a first lens surface $S_1$ closest to said optical deflector is denoted by $S_k$, each of lenses located between said first lens surface $S_1$ and said k-th lens surface $S_k$ is a cylindrical lens having power only in said predetermined deflection direction, and wherein, when a wavelength of said laser light beam is denoted by $\lambda$, and a height of a lens having said k-th lens surface $S_k$ is denoted by $\lambda_k$, lenses located between said optical deflector and said lens having said lens surface $S_k$ are disposed such that the following expression (3), $$\Pi_k \leq 2 \times \left[ \sum_{i=0}^{i=k-1} d_i \tan\theta_i + 2\omega \sqrt{1 + \left( \frac{\lambda \sum_{i=0}^{i=k-1} \frac{d_i}{n_i \cdot \cos\theta_i}}{\pi\omega^2} \right)^2} + \delta + \xi_k \right], \quad (3)$$

is satisfied and centers of said lenses in a lens height direction are aligned with one another, where $d_i$ denotes a surface interval between a lens surface $S_i$ and a lens surface $S_{i+1}$, $d_0$ denotes a surface interval between said reflective surface $S_0$ and said first lens surface $S_1$, $n_i$ denotes a refractive index of a medium between said lens surface $S_i$ and said lens surface $S_{i+1}$ with respect to said laser light beam having said wavelength $\lambda$, $\omega$ denotes a beam waist of said laser light beam on said reflective surface $S_0$ of said optical deflector, $\delta$ denotes a difference between an incident position of a principal ray of said incident laser light beam incident on said reflective surface of said optical deflector in a rotational shaft direction of said optical deflector and a center position of said reflective surface, $\xi$ denotes a width of an allowable area of cracking and chipping in said lens height direction, and $\theta_i$ denotes an incident angle relative to said reflective surface and satisfies the following expression (4), $$\sin\theta_i = \frac{n_0}{n_i}\sin(\Phi + 2\varphi), \qquad (4)$$

assume that $\Phi$ denotes an angle of said laser light beam relative to a plane perpendicular to a rotational shaft of said optical deflector, and $\varphi$ denotes a maximum value of a deflective surface tilt amount, which is a surface tilt amount relative to an ideal reflective surface, including tolerance in considerations of surface tilt of said reflective surface of said optical deflector and shaft tilt of said rotational shaft of said optical deflector.

7. The scanning lens unit according to claim 6, wherein said height of each of said lenses is increased in order from a lens closest to said optical deflector.

8. The scanning lens unit according to claim 6, wherein a lens surface located farthest from said optical deflector has power in said lens height direction.

9. The scanning lens unit according to claim 6, wherein said lens surface $S_k$ is a lens surface of a lens located farthest from said optical deflector.

10. The scanning lens unit according to claim 6, wherein, when a q-th lens surface $S_q$ counted from said first lens surface $S_1$ closest to said optical deflector among lens surfaces is a first surface having power in said lens height direction, that is counted from said optical deflector, a relation of $k \leq q$ is satisfied.

11. An optical scanning apparatus, comprising:
 a scanning lens unit;
 a laser light source; and
 an optical deflector for deflecting a laser light beam emitted from said laser light source to said scanning lens unit,
 wherein said scanning lens unit is disposed between said optical deflector for deflecting an incident laser light beam to a predetermined deflection direction at a constant angular speed and a surface to be scanned, and includes plural lenses,
 wherein, when a reflective surface of said optical deflector is given by $S_0$, and a k-th (k is a positive integer) lens surface counted from a first lens surface $S_1$ closest to said optical deflector is denoted by $S_k$, each of lenses located between said first lens surface $S_1$ and said k-th lens surface $S_k$ is a cylindrical lens having power only in said predetermined deflection direction, and wherein, when said laser light beam includes plural laser light components having different wavelengths and a wavelength of a j-th laser light component counted in ascending order from a first laser light component having a shortest wavelength, of said plural laser light components is denoted by $\lambda_j$ (j=1, 2, . . . ), and when a height of a lens having said k-th lens surface $S_k$ is denoted by $\pi_k$, lenses located between said optical deflector and said lens having said k-th lens surface $S_k$ are disposed such that the following expression (1), $$\Pi_k \leq 2 \times \left[ \sum_{i=0}^{i=k-1} d_i \tan\theta_{ij} + 2\omega_j \sqrt{1 + \left(\frac{\lambda_j \sum_{i=0}^{i=k-1} \frac{d_i}{n_{ij}\cdot\cos\theta_{ij}}}{\pi\omega_j^2}\right)^2} + \delta_j + \xi_k \right]_{\text{maximum value when } j \text{ is changed}} \qquad (1)$$

is satisfied and centers of said lenses in a lens height direction are aligned with one another, where $d_i$ denotes a surface interval between a lens surface $S_i$ and a lens surface $S_{i+1}$, $d_0$ denotes a surface interval between said reflective surface $S_0$ and said first lens surface $S_1$, $n_{ij}$ denotes a refractive index of a medium between said lens surface $S_i$ and said lens surface $S_{i+1}$ with respect to a laser light component having said wavelength $\lambda_j$, $\omega_j$ denotes a beam waist of said laser light component having said wavelength $\lambda_j$ on said reflective surface $S_0$ of said optical deflector, $\delta_j$ denotes a difference between an incident position of a principal ray of said incident laser light beam incident on said reflective surface of said optical deflector in a rotational shaft direction of said optical deflector and a center position of said reflective surface, $\xi_j$ denotes a width of an allowable area of cracking and chipping in said lens height direction, and $\theta_{ij}$ denotes an incident angle relative to said reflective surface and satisfies the following expression (2), $$\sin\theta_{ij} = \frac{n_{0j}}{n_{ij}}\sin(\Phi_j + 2\varphi), \qquad (2)$$

assume that $\Phi_j$ denotes an angle of said laser light component having said wavelength $\pi_j$ relative to a plane perpendicular to a rotational shaft of said optical deflector, and $\varphi$ denotes a maximum value of a deflective surface tilt amount, which is a surface tilt amount relative to an ideal reflective surface, including tolerance in considerations of surface tilt of said reflective surface of said optical deflector and shaft tilt of said rotational shaft of said optical deflector.

12. The optical scanning apparatus according to claim 11, further comprising at least one other laser light source, and being used to expose a photosensitive material having a plurality of photosensitive layers,
 wherein a plurality of laser light sources comprising said laser light source and said at least one other laser light source emit respective laser light beams having respective wavelengths corresponding to photosensitivities of said plurality of photosensitive layers of said photosensitive material.

13. The optical scanning apparatus according to claim 12, wherein said photosensitive material is a photographic paper used for a photographic print.

14. The optical scanning apparatus according to claim 11, wherein said plural lenses composing said scanning lens unit are mounted on respective mounting bases located at different heights.

15. An optical scanning apparatus, comprising:
a scanning lens unit
a laser light source; and
an optical deflector for deflecting a laser light beam emitted from said laser light source to said scanning lens unit,
wherein said scanning lens unit is disposed between said optical deflector for deflecting an incident laser light beam to a predetermined deflection direction at a constant angular speed and a surface to be scanned, and includes plural lenses,
wherein, when a reflective surface of said optical deflector is denoted by $S_0$, and a k-th (k is a positive integer) lens surface counted from a first lens surface $S_1$ closest to said optical deflector is denoted by $S_k$, each of lenses located between said first lens surface $S_1$ and said k-th lens surface $S_k$ is a cylindrical lens having power only in said predetermined deflection direction, and
wherein, when a wavelength of said laser light beam is denoted by $\lambda$, and a height of a lens having said k-th lens surface $S_k$ is denoted by $\pi_k$, lenses located between said optical deflector and said lens having said lens surface $S_k$ are disposed such that the following expression (3), $$\Pi_k \leq 2 \times \left[ \sum_{i=0}^{i=k-1} d_i \tan\theta_i + 2\omega \sqrt{1 + \left( \frac{\lambda \sum_{i=0}^{i=k-1} \frac{d_i}{n_i \cdot \cos\theta_i}}{\pi \omega^2} \right)^2 } + \delta + \xi_k \right], \quad (3)$$

is satisfied and centers of said lenses in a lens height direction are aligned with one another,
where $d_i$ denotes a surface interval between a lens surface $S_i$ and a lens surface $S_{i+1}$, $d_0$ denotes a surface interval between said reflective surface $S_0$ and said first lens surface $S_1$, $n_i$ denotes a refractive index of a medium between said lens surface $S_i$ and said lens surface $S_{i+1}$ with respect to said laser light beam having said wavelength $\lambda$, $\omega$ denotes a beam waist of said laser light beam on said reflective surface $S_0$ of said optical deflector, $\delta$ denotes a difference between an incident position of a principal ray of said incident laser light beam incident on said reflective surface of said optical deflector in a rotational shaft direction of said optical deflector and a center position of said reflective surface, $\xi$ denotes a width of an allowable area of cracking and chipping in said lens height direction, and $\theta_i$ denotes an incident angle relative to said reflective surface and satisfies the following expression (4), $$\sin\theta_i = \frac{n_0}{n_i}\sin(\Phi + 2\varphi), \quad (4)$$

assume that $\Phi$ denotes an angle of said laser light beam relative to a plane perpendicular to a rotational shaft of said optical deflector, and $\varphi$ denotes a maximum value of a deflective surface tilt amount, which is a surface tilt amount relative to an ideal reflective surface, including tolerance in considerations of surface tilt of said reflective surface of said optical deflector and shaft tilt of said rotational shaft of said optical deflector.

16. The optical scanning apparatus according to claim 15, further comprising at least one other laser light source, and being used to expose a photosensitive material having a plurality of photosensitive layers,
wherein a plurality of laser light sources comprising said laser light source and said at least one other laser light source emit respective laser light beams having respective wavelengths corresponding to photosensitivities of said plurality of photosensitive layers of said photosensitive material.

17. The optical scanning apparatus according to claim 16, wherein said photosensitive material is a photographic paper used for a photographic print.

18. The optical scanning apparatus according to claim 15, wherein said plural lenses composing said scanning lens unit are mounted on respective mounting bases located at different heights.

* * * * *

UNITED STATES PATENT AND TRADEMARK OFFICE
CERTIFICATE OF CORRECTION

PATENT NO. : 7,075,689 B2 Page 1 of 1
APPLICATION NO. : 11/189774
DATED : July 11, 2006
INVENTOR(S) : Yoichi Suzuki et al.

It is certified that error appears in the above-identified patent and that said Letters Patent is hereby corrected as shown below:

In the claims:

Claim 1

At column 13, line 42, change "$\pi_k$" to --$\Pi_k$--.
At column 14, line 7, change "$\in_j$" to --$\xi_j$--.
At column 14, line 15, change "$\theta_j$" to --$\Phi_j$--.
At column 14, line 20, change "$\phi$" to --$\varphi$--.

Claim 6

At column 14, line 50, change "$\lambda_k$" to --$\Pi_k$--.
At column 15, line 6, change "$S_i$" to --$S_1$--.
At column 15, line 28, change "$\phi$" to --$\varphi$--.

Claim 11

At column 16, line 8, change "$\pi_k$" to --$\Pi_k$--.
At column 16, line 54, change "$\pi_j$" to --$\lambda_j$--.
At column 16, line 55, change "$\phi$" to --$\varphi$--.

Claim 15

At column 17, line 31, change "$\pi_k$" to --$\Pi_k$--.
At column 18, line 23, change "$\phi$" to --$\varphi$--.

Signed and Sealed this

Nineteenth Day of December, 2006

JON W. DUDAS
*Director of the United States Patent and Trademark Office*